United States Patent [19]

Carpenter et al.

[11] Patent Number: 4,823,598
[45] Date of Patent: Apr. 25, 1989

[54] GAS METERING APPARATUS FOR USE WITH SMALL VOLUME, SMALL FLOW GAS SOURCE

[76] Inventors: Clarence W. Carpenter, 8610 Cederbrake Dr., Houston, Tex. 77055; Coleman Wood, 902D W. 23rd, Houston, Tex. 77008

[21] Appl. No.: 135,314

[22] Filed: Dec. 21, 1987

[51] Int. Cl.[4] ............................................. G01F 11/02
[52] U.S. Cl. .......................................... 73/232; 73/239
[58] Field of Search .................. 73/149, 232, 239, 19, 73/3, 223, 243, 247

[56] References Cited

U.S. PATENT DOCUMENTS

| | | | |
|---|---|---|---|
| 2,892,346 | 6/1959 | Sargent | 73/239 |
| 3,463,004 | 8/1969 | Withnell | 73/232 |
| 3,657,925 | 4/1972 | Gross | 73/239 |

*Primary Examiner*—Herbert Goldstein
*Attorney, Agent, or Firm*—Gunn & Nichols

[57] ABSTRACT

A precision gas metering apparatus is disclosed and comprises facing duplicate cylinders each having a piston therein, wherein the two cylinders are aligned with one another so that a common non-rotating shaft moves pistons in each. The shaft is driven by a stepping motor having a traveling nut connected to said shaft to impart rotation from the motor which is converted into linear movement of the shaft. With suitable valves and a pressure transducer, gas to be measured is delivered first to one volume and then to the other, the pistons being driven to equalize in flowing gas pressure to atmospheric pressure level, and thereafter summing the total volumetric filling by summing each filling of each chamber, and also summing any partial fillings. A pressure transducer assures that the filled chambers are held to a specified volume.

14 Claims, 2 Drawing Sheets

GAS METERING APPARATUS FOR USE WITH SMALL VOLUME, SMALL FLOW GAS SOURCE

BACKGROUND OF THE DISCLOSURE

The present disclosure is directed to gas metering apparatus and more particularly to apparatus which measures gas with a high level of precision. It is particularly intended for use with a small volume, small flow gas source, but by choosing appropriate motor, cylinder size and pressure response the system can be extended to high gas volume and rates. Several examples of such a device in use and operation should be noted. First of all, it is necessary often to measure a small quantity of gas devolved from a chemical process. Assume as an example that a specified quantity of materials are placed in a closed beaker. Assume that they generate a specific gas volume. If the beaker is small and the gas volume is likewise small, precise and accurate measurement is required to obtain an indication of conversion in the process. The present apparatus assists in measuring such a small volume. Another circumstance in which small volumetric gas flows are measured is the situation in which a solid core sample is retrieved from a well. Assume further that gas entrained in the core sample must be measured. The core sample will devolve gas over a period of time. The volume of gas is quite small. It must be accurately measured during the collection of gas for the purpose of properly determining values and significance of the core sample data. The present apparatus is such an accurate measuring system. It is a gas metering collection apparatus for use in conjunction with a low pressure, low flow rate source. This is particularly useful in laboratory test circumstances. The apparatus has a piston and cylinder which draw the sample in. The displacement of the cylinder is precisely measured and the stroke of the piston is also precisely controlled. This defines a fixed or known volume. The apparatus also includes a transducer which measures the pressure in this volume so that it is fixed or set. The cylinder is provided in duplex, and a valving system is connected so that first one cylinder and then the other is charged to assure that the gas flow is continuously received and measured. A summation system is likewise included to represent the output and to convey the measured volume in some suitable calibrated indication. Typically, the volume is set at a specified pressure and is indicated in milliliters. While the foregoing speaks generally of the foregoing apparatus, a more detailed description is set forth below upon reference to the drawings of the apparatus.

DETAILED DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
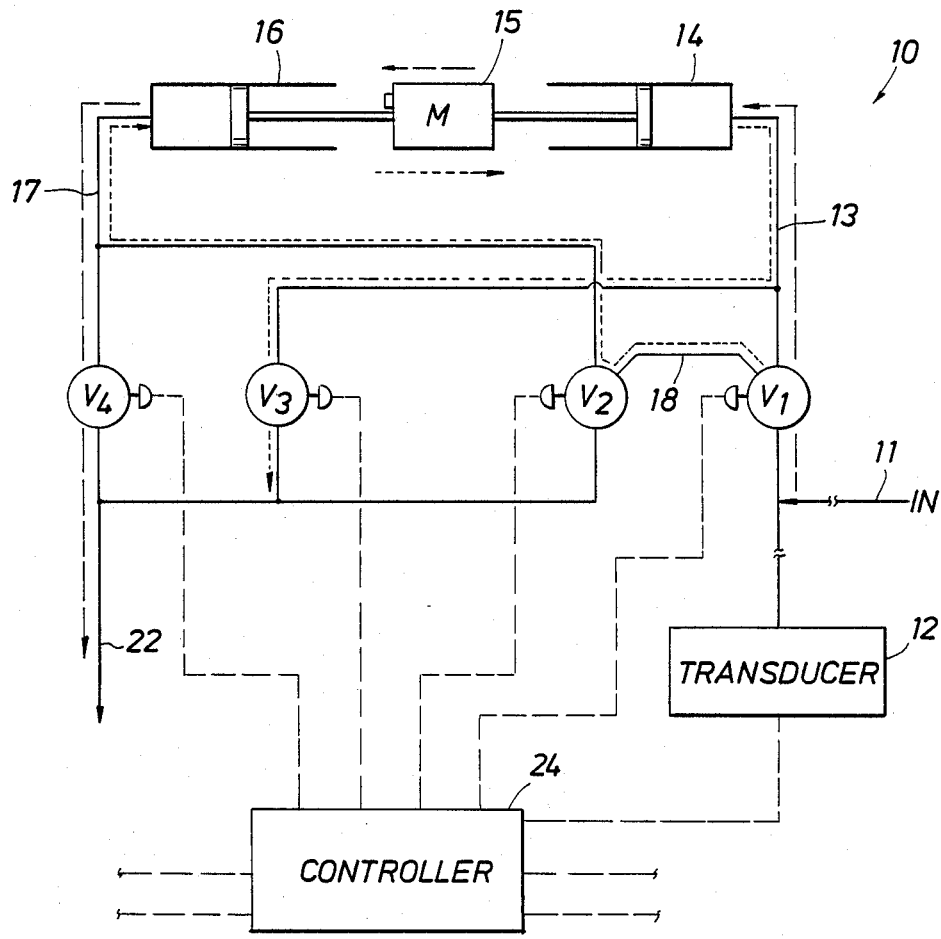
FIG. 1 is a schematic valving system of the gas metering apparatus of the present disclosure showing details of arrangement of a valving system and duplex storage cylinders.

Attention is first directed to FIG. 1 of the drawings where the numeral 10 identifies the gas metering apparatus of the present disclosure which is illustrated in schematic form. Beginning at the input, a supply line from a low pressure, low flow rate source is incorporated at 11. It connects to a sensitive transducer 12. Transducer pressure level forms a signal input to a controller. A suggested pressure level is about 0.5 inches of water. The pressure can exceed this, but an output signal is provided to a controller to be described, the transducer providing such a signal to trigger operation so that continuous transfer of the gas to be measured is obtained. The controller will be described as a device for system adjustment. The inlet line 11 connects with a first valve indicated by the symbol $V_1$. It has an outlet line 13 which connects to a first cylinder 14. A duplicate, oppositely phased cylinder 16 is included, the two being driven by a common motor 15. The system includes an additional valve $V_2$ connected to a line 17. There is a flow line 18 from $V_1$ to $V_2$. The gas to be measured is directed by the valves $V_1$ or $V_2$ for distribution either to the cylinder 14 or the cylinder 16. Thus, the gas input is always received and distributed to one or the other of the two cylinders. When one cylinder is denied gas flow, it is all directed to the other cylinder. The system includes additional valves 19 and 20 again indicated as $V_3$ and $V_4$. There is a collection or vent line 22 for venting the gas to atmosphere. After gas measurement, it is waste gas unless an unrelated further analysis of the gas is desired. The symmetry of the valving system enables gas to be delivered to one of the cylinders while voiding the other cylinder. The several valves are subject to control by a controller means 24 which will be detailed in FIG. 3 of the drawings.

Figure 2:
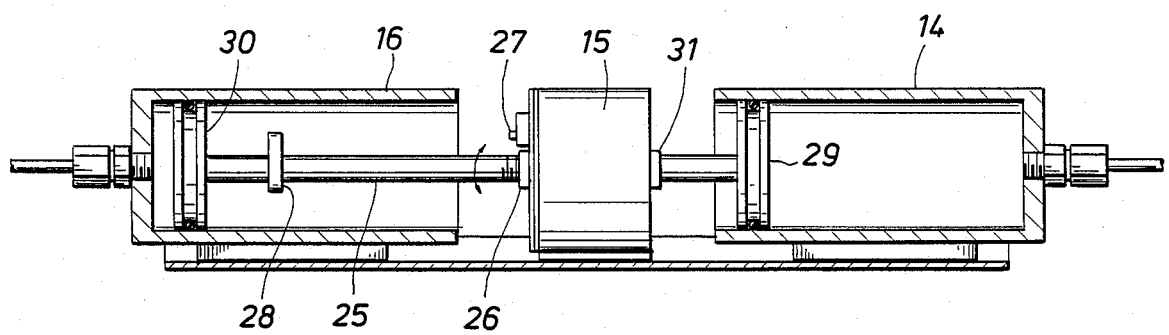
FIG. 2 is a sectional view through duplex storage cylinders which further illustrates means for moving the pistons in synchronized fashion.

Attention is directed to FIG. 2 of the drawings which shows the cylinders in some greater detail. First of all, it should be noted that the cylinders 14 and 16 are duplicate in size, are open at one end and face one another. They are mounted in opposite relationship on a mounting plate. There is a single shaft identified at 25. The shaft passes through the motor 15. The motor 15 is a stepper motor. The shaft is provided with threads thereon. The motor 15 does not have an internal shaft. Rather, it is axially hollow through a central nut 26. In other words, the rotor of the motor is a hollow fitting which is internally threaded to mesh with the threads on the shaft 25. When the nut 26 is rotated, relative rotation imparts linear movement to the shaft 25. The shaft 25 does not rotate because it is held against rotation by the pistons and a guide 31, to be described. The guide 31 has a fixed pin in a slot on the shaft to prevent rotation of the shaft while permitting translation. Thus, when the motor 15 makes one full revolution, the shaft 25 is moved by a distance equal to the lead of the thread on the shaft. Accordingly, each revolution can be accurately measured because it is represented by a specific number of stepping signals. The full stroke for the shaft 25 is defined by a specific number of pulses. This is determined by the number of steps per revolution and the number of revolutions required to achieve maximum travel. This can be calibrated in advance and is known because the system accommodates a fixed travel. To further assure proper traversing of the system and to measure travel from a known reference location, an index or home switch is included at 27. It has a switch contact located so that a protruding cam 28 on the shaft will contact the switch 27 and thereby indicate to the controller circuitry 24 the precise location of the shaft at the indexed or home position and hence the location of the pistons in the cylinders 14 and 16.

Duplicate pistons are included at 29 and 30. They are sealed with suitable seal rings. They provide duplicate chambers in the two cylinders for metered storage of gas. Thus, the system operates to first fill one and then the other of the two cylinders. This operation will become more readily apparent on explanation of the controller circuitry shown in FIG. 3 of the drawings.

Figure 3:
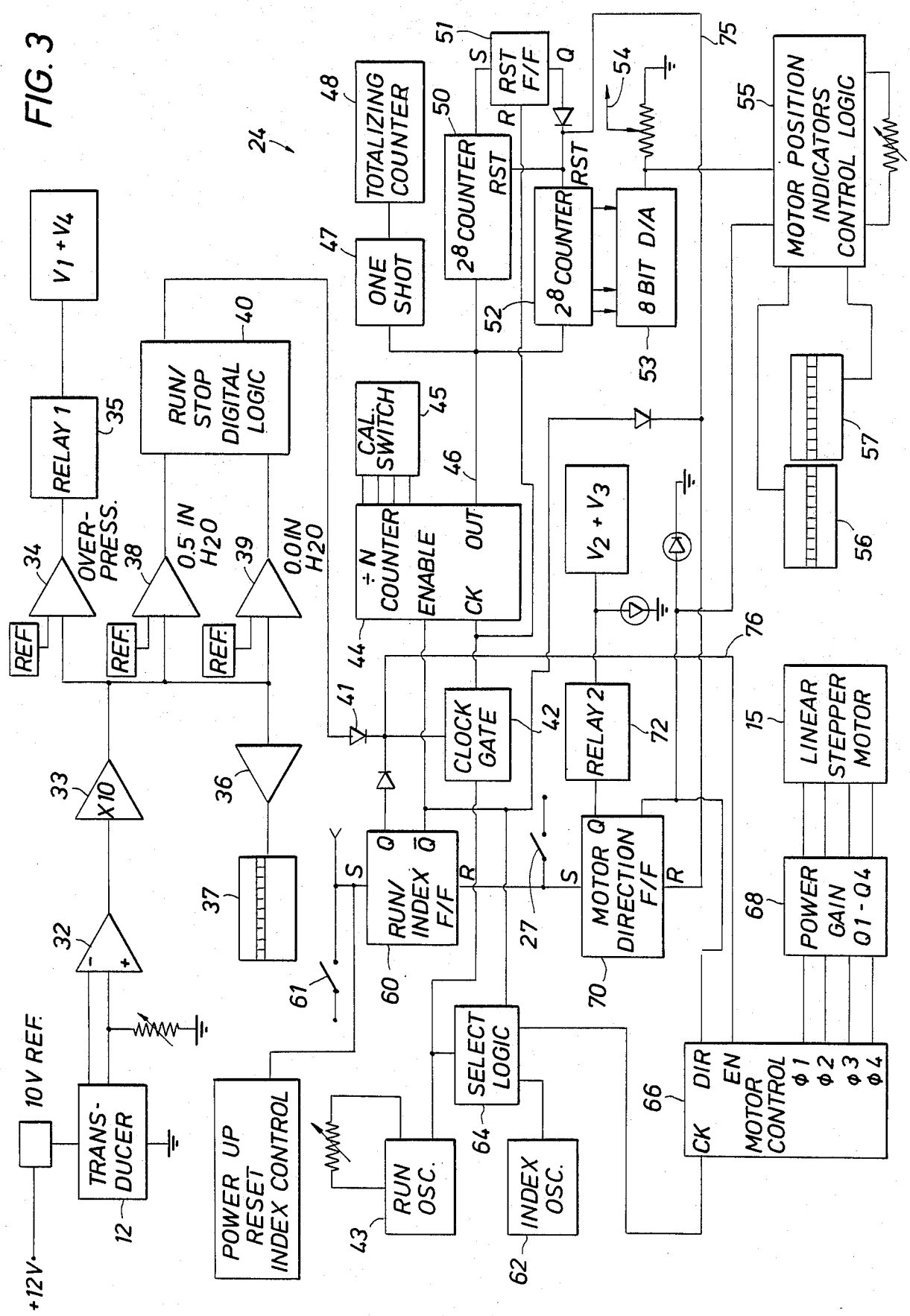
FIG. 3 is a schematic diagram of a control and indicating circuit for use with the gas metering apparatus.

In FIG. 3, the transducer 12 is located at the upper left corner. It is provided with a precision excitation voltage for operation. A bridge type strain gauge pressure transducer is preferred to form a signal voltage proportional to pressure across two legs of the bridge and input to a differential amplifier 32. That amplifier provides an output to another amplifier 33. When the pressure is excessive (defined by the controller 24) at the transducer, an over pressure state exists, and the signal is therefore provided through an amplifier 34 to a first relay 35. The relay 35 is connected to $V_1$ and $V_4$ to open them to relieve the over pressure condition. This occurs in the event of a qualified signal, namely one which has been compared and determined to be above a specified level. A display driver amplifier 36 serially connects with a bar graph pressure display 37. Any other type of indicator or annunciator can be used. This provides the operator with a graphic representation of pressure.

The transducer signal is also input to a pair of comparators at 38 and 39. With suitable adjustments for the reference voltages, they provide output signals for a digital logic circuit 40. This recognizes that the pressure is within or without specified limits. Consider as an easy example the following pressure levels. If the pressure exceeds 0.5 inches, a run signal is formed. The motor then runs until the pressure drops to 0.0 inches. When that level is recognized, the logic circuit 40 then stops. For these reasons, the system incrementally operates the motor 15 and thereby expands the chamber which is receiving the gas. This continues until the pressure in the chamber is restored to a specified level. An example might be 0.0 inches or atmospheric pressure. The pressure levels are defined by the reference voltages for the comparators 38 and 39.

The circuit 40 provides an output through a diode 41 to a clock gate 42. The clock gate 42 is provided with a continuous procession of clock pulses from an oscillator 43. The oscillator is adjusted to a set frequency and runs continuously. It provides a procession of pulses, and the clock gate 42 when properly gated by the signal from the logic signal 40 then forms clock output pulses for a programmable counter 44. The counter is conveniently provided with a switch 45 which enables stroke calibration for the motor input. The counter 44 divides the clock pulse procession by N. It then forms an output pulse on a conductor 46. That pulse is provided to a single shot 47 connected to a counter 48. This is a total counter which can be read by the operator. The pulses on the conductor 46 are also input to an eight bit counter 50. This determines stroke length. In other words, the length of stroke of the gas storage apparatus shown in FIG. 2 is a fixed number of pulses as determined by scale factors including pulses per revolution for the motor 15, lead of the screw 25, and number of turns required for full travel for the screw. This counter is adjusted to control stroke length from indexed position out to maximum stroke volume, and once determined, it is then fixed. It counts to a specified level and is retriggered by a reset flip-flop 51. The reset flip-flop also provides a reset signal to a counter 52. The counter 52 is used to drive a digital to analog converter 53 which then forms an output signal on the conductor 54 which is an analog representation of volume. Volume again refers to the volume that is temporarily captured in the cylinder. The analog output signal is provided to a motor position indicator control logic circuit 55. The circuit 55 provides a signal to a pair of segmented bar graph displays 56 and 57. They operate in conjunction with the left and right cylinders shown in FIG. 2 to thereby indicate location of the respective pistons. Moreover, the indicators 56 and 57 are identical in construction to the indicator 37. The three indicators respond to analog signals. A flip-flop 60 is provided with a control voltage through a switch 61 to assist in indexing the system, that is, to drive the system to some specified home location. A power up reset circuit automatically indexes the system when the device is first turned on. The indexing switch 61 is normally used to set the location of the equipment at the beginning of operation. To this end, once the equipment is located, it is no longer necessary to operate the switch 61.

The run oscillator 43 provides pulses at a selected rate. For indexing, a separate oscillator 62 is incorporated and it forms pulses at a somewhat higher rate so that the indexing operation takes the least possible time. The oscillators 43 and 62 provide inputs to a select circuit 64. When indexing is required, the higher speed is selected by operation of the flip-flop 60 which in turn operates the circuit 64. In either case, one oscillator or the other is connected directly by the select circuit 64 to the motor control circuit 66. This is a circuit which provides controlled four phase output signals to a power gain circuit 68 for amplification which in turn drives the stepper motor 15. The amplified current levels assure that the current levels necessary for operation are provided. The stepping rate is determined by connection of one of the two oscillators just described to the motor control circuit 66. Direction is determined by a motor direction flip-flop 70. This circuit is controlled by the home switch and counters 50 and 52 reset command signal path 75. When there is a motor direction reversal, this signal at the relay 72 provides a control signal for operation of $V_1$ and $V_3$. They are switched in synchronization. Moreover, this signal is provided to an optically visible LED 73 for observation by the operator. When the relay 72 is in the other state, a similar signal is provided through the LED 74. Moreover, the motor direction flip-flop 70 forms an output signal which is provided also to the motor position indicator control logic circuit 55.

Direction reversal is achieved when the counter 50 reaches a set count or else during power up or when the index command is manually given, and reset for that circuit is then operated. This forms the reversal signal on the conductor 75. The motor control circuit 66 is also provided with an enable signal from the flip-flop 60 which is delivered over the conductor 76. As will be understood, the motor control circuit thus responds to the signals on the conductor 75 and 76 for enabled operation in a particular direction. The speed or rate is determined by the particular oscillator connected to the select circuit 64. In turn, this forms the appropriate phased driving signals output to the stepper motor 15.

Consider a simple situation to describe one aspect of operation. First of all, assume that the motor has moved the pistons to one extremity of movement. At that location, assume that the motor requires 100 revolutions to achieve the full length of stroke. Further assume that the stepping motor requires 200 pulses per revolution. This means that 20,000 pulses are required for travel from one extreme to the other of movement. The transducer 12 senses pressure at the inlet line which is also the pressure within the cylinder connected through $V_1$. This pressure is reduced as the motor 15 operates, each step of the motor reducing pressure until a requisite lower pressure is achieved. The present system has a rate of response which is determined by stepper motor speed in conjunction with scale factors including diameter of the cylinders 14 and 16. The system operates so that the pressure in the cylinder receiving the gas charge is restored to the pressure determined by the reference voltage for the transducer 12. When the pressure is restored, this event is recognized by the run/stop digital logic circuit 40. It forms a signal then arresting the movement. Recall that the motor had previously moved the shaft and associated pistons to this intermediate location. This is represented by a count total stored in the counter 50 which will be less than the maximum total required for reversal or 20,000 pulses in this instance.

As will be understood, this condition is sustained until additional gas is introduced. When that occurs, the transducer will sense an increase in pressure and form a signal causing the motor to further advance. The motor operation will move the pistons from the previous intermediate position to another intermediate position which is symbolized by an increase count in the counter 50. This will continue indefinitely until motor reversal is required. This occurs when the motor has traveled to the end of permitted movement and the counter 50 reaches the maximum value. Reset then occurs, and a signal for reversal of direction is formed. This signal is supplied to the motor controller 66. The counter then starts from zero with reversal of the motor. Moreover, travel of the motor shaft 25 in the opposite direction then continues until the cam 28 on the motor shaft 25 either continuously (or with interruptions) advances to the home, or index position sense switch 27. Since the motor 15 responds to a finite number of pulses (20,000 in this example) the motor operates back and forth between two locations without hysteresis. Each traverse of the pistons then represents storage of a number of milliliters of gas at a fixed pressure determined by the transducer 12 and also determined by the cross sectional area of the two cylinders 14 and 16. The storage sequence continues indefinitely until the equipment is switched off or no further gas is supplied. It can store gas supplied as slowly as permitted. In fact, the device has no specified minimum flow rate, and only minimal pressure is needed to collect and store gas.

The present apparatus can be altered in operation by change of scale factors as evidenced above. Scale factors include those particularly associated with the cylinders 14 and 16 and the stepping motor speed, lead of the screw, and maximum stroke. Also, another scale factor that can be adjusted is the number of pulses applied when the device is switched on. If need be, the counter 50 can be scaled in milliliters direct so that one count on the counter 50 is represented by the number of pulses required for the motor 15 to advance, changing the volumetric storage by the one milliliter increment.

While the foregoing is directed to the preferred embodiment, the scope is determined by the claims which follow.

What is claimed is:

1. A gas measuring apparatus which comprises:
   (a) a movable piston in a cylinder defining a gas receiving chamber therein;
   (b) motor means for moving said piston in said cylinder to change the volume of the chamber therein;
   (c) control means connected to said motor means for controlling operation of said motor means to thereby control movement of said piston in said chamber;
   (d) pressure transducer means connected to the chamber within said cylinder for measuring the pressure therein and forming a signal for said control means to move said piston to obtain a specified pressure;
   (e) said control means moving said motor means incrementally by uniform increments, said control means forming a countable signal on each incremental operation thereof and wherein said countable signals are provided at an output terminal;
   (f) summing means connected to receive said countable signals to form an incremental count representing gas volume of said gas receiving cylinder; and
   (g) said control means controlling said motor means to seek the specified pressure after gas is received in said chamber so that said summing means incremented count represents gas volume received in said chamber.

2. The apparatus of claim 1 including a first valve means connected between a source of gas and said cylinder to deliver gas thereinto.

3. The apparatus of claim 2 including a second valve means connected with said cylinder for controllably voiding gas therein prior to admission of gas through said first valve means.

4. The apparatus of claim 1 including a second cylinder and second piston arranged in said second cylinder duplicate of said first cylinder, said first and second cylinders defining first and second chambers for receiving gas to be measured.

5. The apparatus of claim 1, including:
   (a) a second cylinder with a second piston therein to define a second gas receiving chamber;
   (b) wherein said motor means is constructed and arranged to simultaneously move said pistons in their respective cylinders, and wherein said motor means provides out of phase movement jointly to said first and second pistons; and
   (c) said motor means forms incremented counts on receiving additional gas in said first chamber and separately on receiving additional gas in said second chamber wherein said motor means moves said pistons simultaneously and out of phase;
   (d) valve means for delivering additional gas flow to said first and second chambers so that gas is delivered into a chamber and causes expansion thereof by said motor means; and (e) said valve means further venting said first and second chambers of gas therein to prepare said chambers to receive gas.

6. The apparatus of claim 5 wherein said motor means includes a stepper motor incrementally and controllably operated through a specified motor movement.

7. The apparatus of claim 6 including a driven threaded nut on a lead screw cooperation with said stepper motor is capable of forming steps to provide opposite motion to said first and second pistons, wherein total stroke is dependent on the number of steps required by said stepper motor for one revolution thereof multiplied by the lead on said screw.

8. The apparatus of claim 6 including a reciprocating screw drive cooperative with said stepper motor to provide opposite motion to said first and second pistons, wherein total piston stroke is determined by the number of steps of said stepper motor for one revolution multiplied by lead of said screw drive.

9. The apparatus of claim 7 wherein said pistons move in reverse directions to cause a cam to engage a switch and said switch reverses operation of said motor.

10. The apparatus of claim 5 wherein said valve means delivers gas to be measured to only one of said two chambers and then switches to deliver gas to the other of said chambers.

11. The apparatus of claim 10 wherein said stepper motor is operated by said pressure transducer means and said pressure transducer means forms a signal indicative of pressure in said one cylinder in excess of a set level.

12. A method of measuring a miniscule flow of gas from a low flow, low pressure source, wherein the method comprises the steps of:
(a) delivering the gas to be measured through a first valve means;
(b) storing temporarily the gas undergoing measurement in one or the other of a pair of gas storage chambers which are expandable to a specified maximum volume;
(c) moving a means within said chambers to expand said chambers between specifically determined minimum and maximum volumes;
(d) controlling the pressure within said one chamber during gas delivery by expanding said chamber to regulate the pressure therein at a specified level until the volume is maximum and thereafter switching all additional flow to the other of the chambers and continuing to fill the second thereof indefinitely;
(e) after filling said first volume, thereafter voiding the first volume to allow subsequent refilling after filling of the second volume; and
(f) regulating the pressure so that said first and second volumes have known pressures therein when full and summing all of the volumes so filled to obtain the volumetric measurement.

13. The method of claim 12 including the step of jointly advancing and retracting pistons in said chambers thereby measuring gas in said chambers.

14. The method of claim 12 including the step of calibration of a programmable counter to electronically compensate for variations in piston and cylinder size.

* * * * *